No. 877,640. PATENTED JAN. 28, 1908.
J. F. GENT.
APPARATUS FOR THE DEGERMINATION OF INDIAN CORN.
APPLICATION FILED JUNE 17, 1907.
4 SHEETS—SHEET 1.
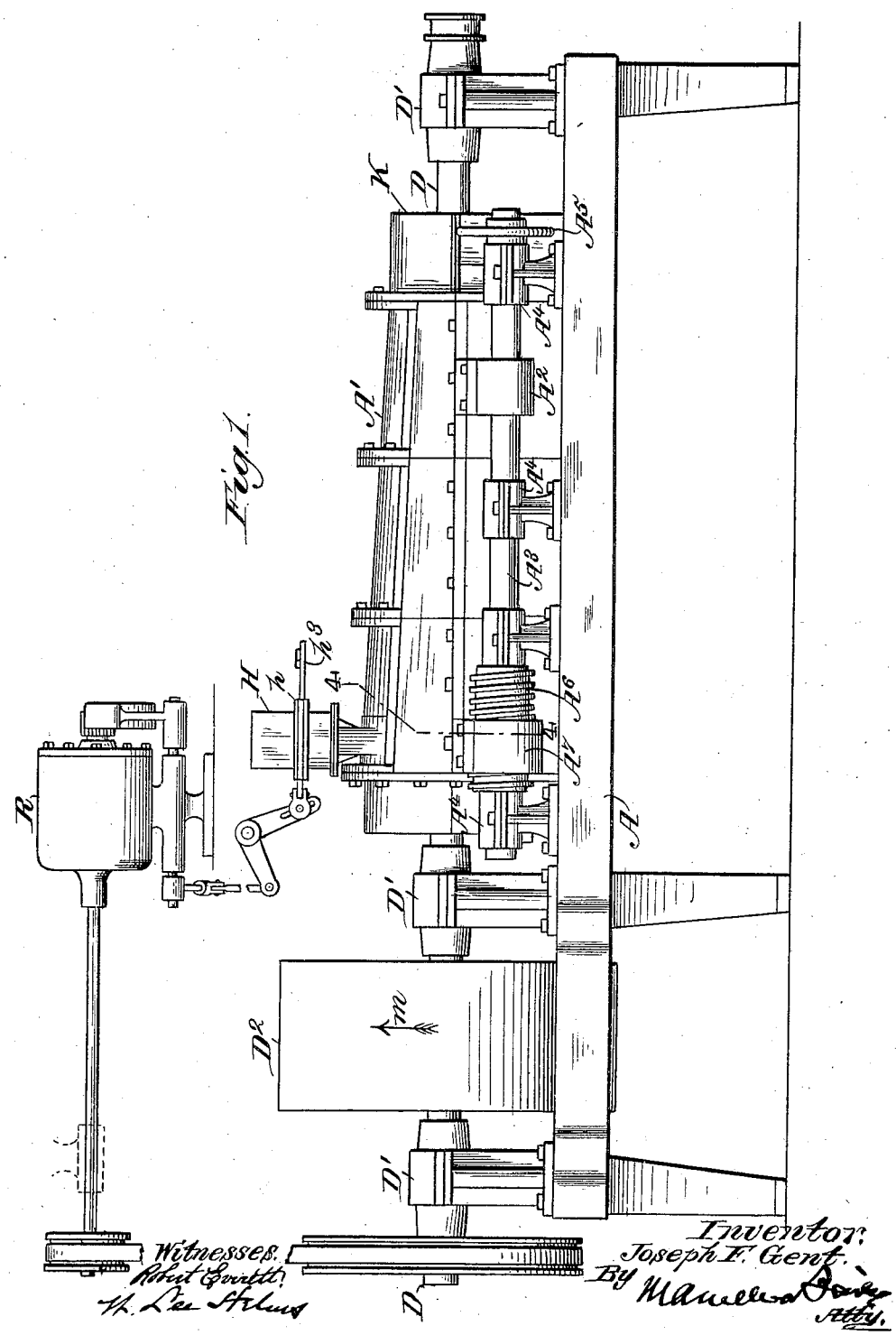

No. 877,640. PATENTED JAN. 28, 1908.
J. F. GENT.
APPARATUS FOR THE DEGERMINATION OF INDIAN CORN.
APPLICATION FILED JUNE 17, 1907.
4 SHEETS—SHEET 2.
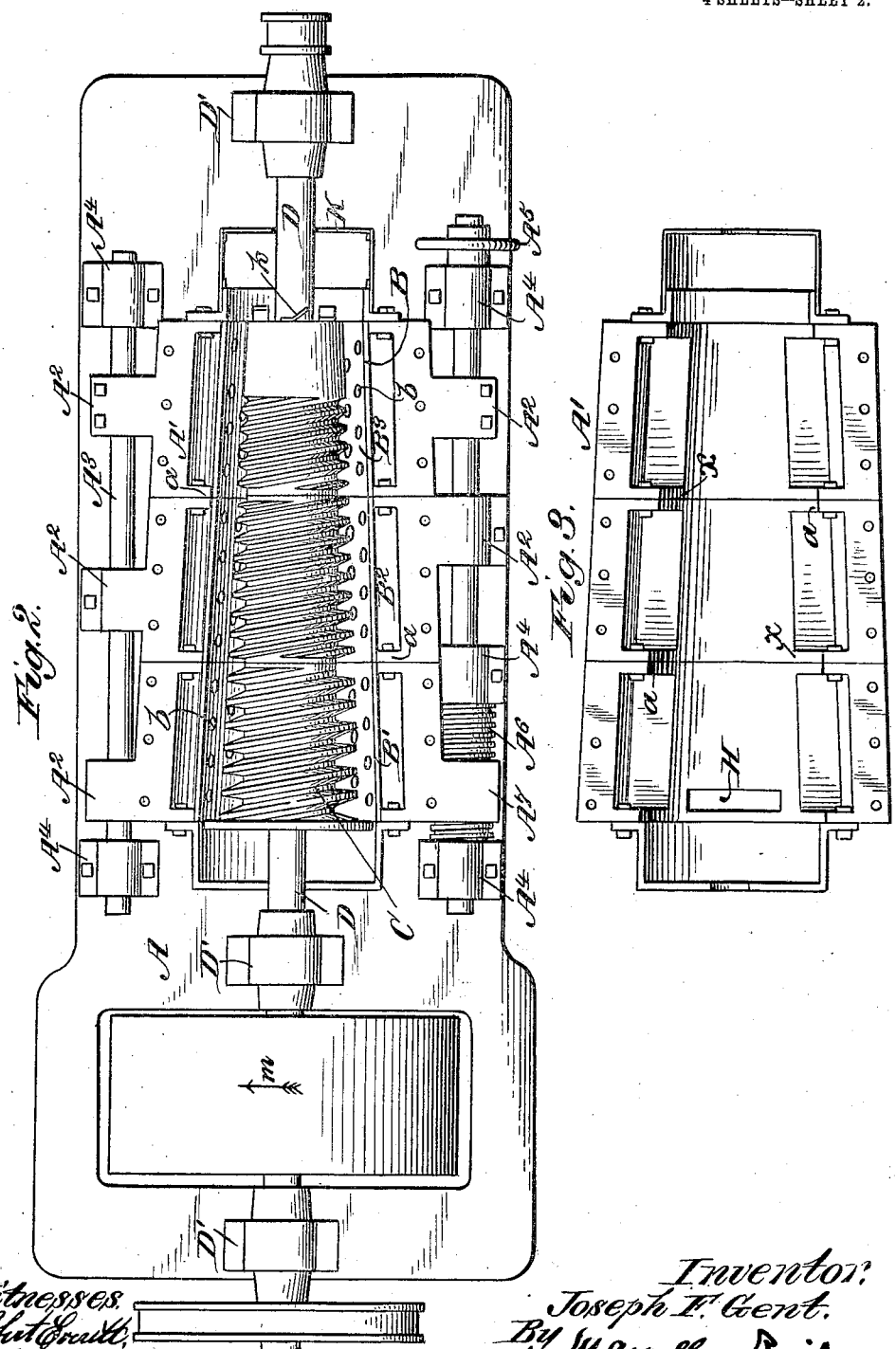

No. 877,640. PATENTED JAN. 28, 1908.
J. F. GENT.
APPARATUS FOR THE DEGERMINATION OF INDIAN CORN.
APPLICATION FILED JUNE 17, 1907.
4 SHEETS—SHEET 3.
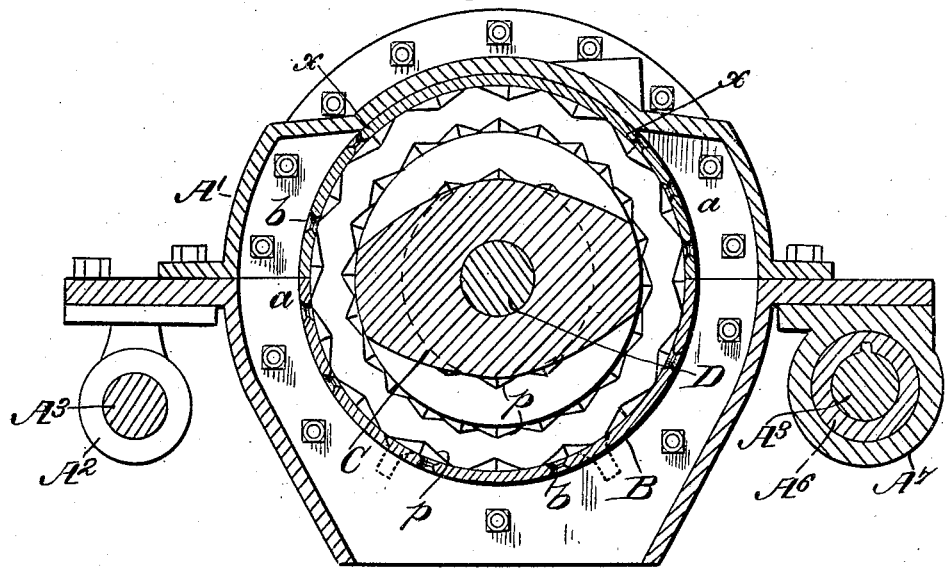
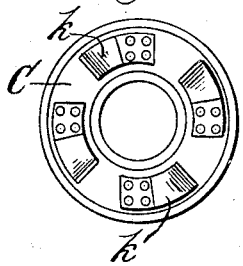
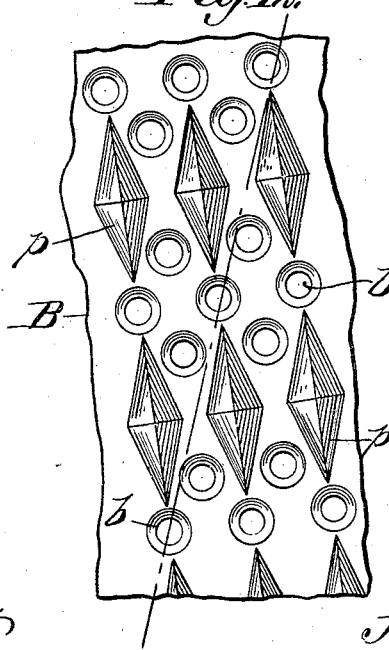
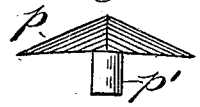
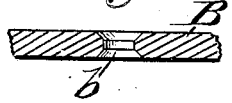
Witnesses.
Inventor:
Joseph F. Gent.

No. 877,640. PATENTED JAN. 28, 1908.
J. F. GENT.
APPARATUS FOR THE DEGERMINATION OF INDIAN CORN.
APPLICATION FILED JUNE 17, 1907.
4 SHEETS—SHEET 4.
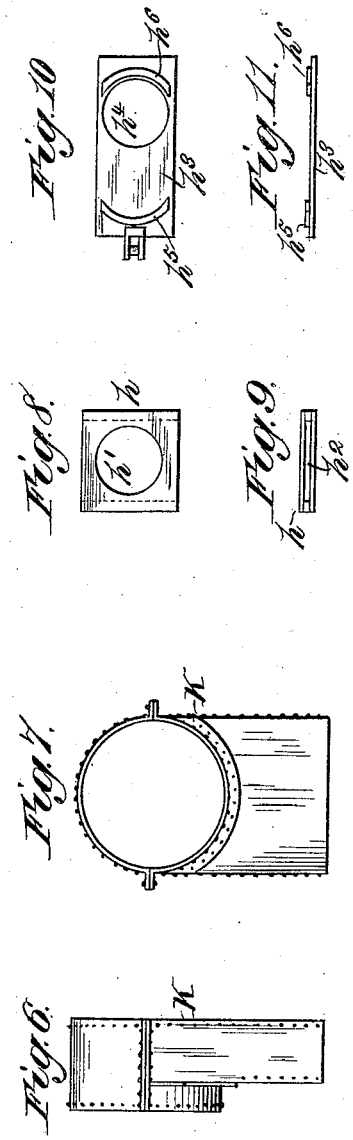
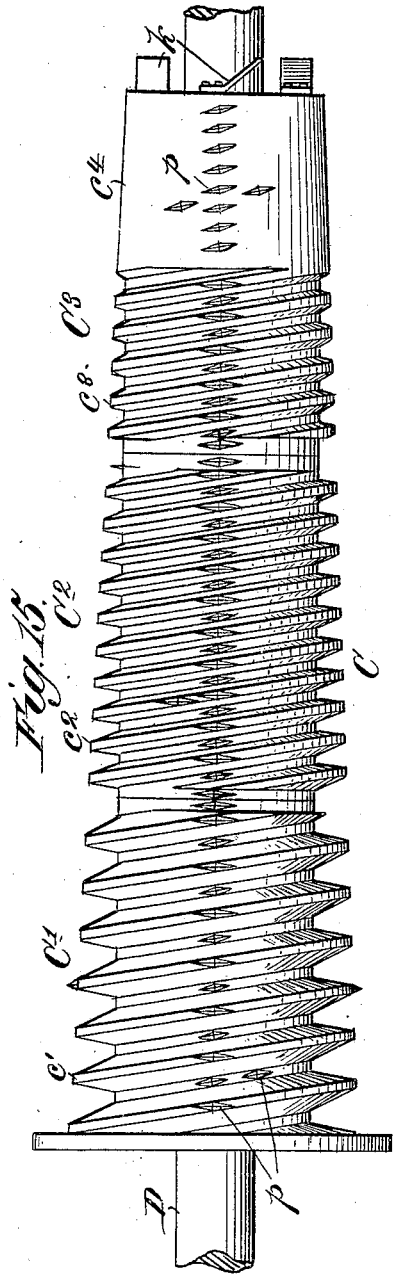
Witnesses.
Inventor:
Joseph F. Gent.

UNITED STATES PATENT OFFICE.

JOSEPH FRANKLIN GENT, OF TERRE HAUTE, INDIANA, ASSIGNOR OF TWO-THIRDS TO THOMAS T. GAFF, OF BARNSTABLE, MASSACHUSETTS.

APPARATUS FOR THE DEGERMINATION OF INDIAN CORN.

No. 877,640.   Specification of Letters Patent.   Patented Jan. 28, 1908.

Application filed June 17, 1907. Serial No. 379,377.

*To all whom it may concern:*

Be it known that I, JOSEPH FRANKLIN GENT, of Terre Haute, county of Vigo, and State of Indiana, have invented a new and useful Improvement in Apparatus for the Degermination of Indian Corn, of which the following is a specification.

In Letters Patent No. 735,664 of August 4, 1903, I have described and claimed an apparatus for degerming maize comprising a rotary power driven "cylinder" composed of a plurality of externally toothed sections decreasing in diameter as they approach the tail of the machine, in combination with a stationary "concave" or surrounding jacket composed of corresponding sections armed internally with teeth or projections to coöperate with those on the cylinder sections, and a screen in the lower portion of each section of the concave, through which the properly reduced material is carried off. The action of the machine is essentially a breaking, instead of a grinding or crushing one—the breaking or splitting of the kernels being due to concentration of, and pressure on, the grains, and being to a great extent lengthwise of the kernel, with a view to the ready detaching of the germ from the starch bearing portions.

My present invention is an improvement upon this patented apparatus.

It is my principal object to graduate the pressure, in such manner that the material will be subjected to successively increased pressure—as for example first to a degree that will break the weakest grains, the second to a degree that will break the next weakest grains, the third to a greater degree, and so on.

I have ascertained that if a measure or vessel be filled with corn, then if the corn be compressed approximately to solidity of bulk it will fill but 70% of the space in that measure. I have also discovered that if a given charge of corn be compressed to a point anything like solidity of bulk, approximately 90% of the kernels will be broken lengthwise of the grain—a condition most favorable to insure degerming; and if, during compression, the parts of the grains be caused to slightly change position relatively to one another, the hull will be loosened and the germ will be broken away from the longitudinally split grains, by the friction thus induced between the particles throughout the concentrated mass—degermination and hulling being due to concentration by compression, and to friction under compression, as contradistinguished from the crushing, beating and scouring methods heretofore used. This way of treating the grain possesses the following advantages (among others) over the methods heretofore generally in use: 1. More even and regular breaking of the grains, lengthwise of the kernel. 2. The slight changing of position of the breaking and broken pieces removes the germs and hulls by friction of one piece against the others, and, as a result, the finely comminuted inseparable material, called "meal", produced by the old methods is reduced to a minimum. 3. The germs are less broken and are capable of easier recovery. To effect these advantageous results I provide the "cylinder" with spiral threads, forming means for conveying the material along, as well as for concentrating it—projections being provided both upon the periphery of the threads and in the groove between the threads, for the purpose of giving the slight movement to the grains needed to obtain effectual breaking, etc. Coöperating projections are also provided upon the concave. The preferred shape of these projections is pyramidal, of rhomb or diamond shape in horizontal section. The threads on all of the cylinder sections have the same pitch, that is to say, they are the same distance apart at their bases, and consequently have the same angle of inclination to the axis of the cylinder, but they vary in size, decreasing in depth and increasing in number as they approach the tail of the machine. They are thus made in order to compensate for the loss of material escaping through the concave, and to increase concentration, and consequent pressure on, the charge as it approaches the tail of the machine. The perforations or discharge holes in the concave extend around about three fourths of its circumference preferably, so as to afford free and immediate escape for all properly reduced particles. And the projections on the concave are interspersed between the discharge holes and are pitched to facilitate the movement of the grain towards the tail of the machine. It is in this combination of instrumentalities that my present invention is mainly comprised.

To enable those skilled in the art to make and use my invention I will now proceed to describe more in detail the manner in which the same is or may be carried into effect, by reference to the accompanying drawing in which—

Figure 1 is a side elevation of a machine embodying my improvements. Fig. 2 is a plan of the machine with the top of the casing removed. Fig. 3 is an inverted plan of the top of the casing with the upper half of the concave removed therefrom, in order to show the internal ribs to which the concave is attached. Fig. 4 is a cross section, on line 4—4, Fig. 1, of the cylinder, the casing and the concave contained in the casing. Fig. 5 is an end elevation of the tail end of the cylinder. Figs. 6 and 7 are a side elevation and front elevation respectively of the tail spout. Figs. 8 and 9 are a plan and edge view respectively of the feed plate in the feed box. Figs. 10 and 11 are a plan and side edge view respectively of the gate by which the opening through the feed plate is controlled. Fig. 12 is an elevation on much enlarged scale of a small portion of the "concave" designed to illustrate more clearly the form and arrangement of the perforations in it, and the projections mounted on it. Fig. 13 is a side elevation, on similar scale, of one of the projections. Fig. 14 is a cross section, on similar scale through one of the perforations in the "concave." Fig. 15 is a view on enlarged scale of the "cylinder." In this figure, as well as in the others, I have represented only a few of the projections with which both the "cylinder" and "concave" in practice are armed.

A (Fig. 1) is the supporting frame, of any suitable construction. Supported by the frame is the casing $A^1$ which tapers from the feed end towards the tail or discharge end. It is composed of sections (three in this instance) which are bolted together, and is divided lengthwise diametrically into two halves, the flanged side edges of which meet and are bolted together. The upper half or top of the casing is shown inverted in Fig. 3. The concave B is composed of a similar number of similarly tapered sections which are secured to ribs $a$ on the interior of the casing. In the top part of the casing, as indicated in Fig. 3, the ribs $a$ merge into the body of the casing at the points $x$ $x$; and in this way I am enabled to extend the screen or perforated surface of the concave around about three quarters of the circumference of the casing. The open spaces between the concave and the casing and bounded by the ribs constitute the subdivided passages through which the separated material which escapes at various points through the concave, is conveyed to its appropriate spout, each passage having its own separate spout, so that the material discharged from any one section, may be kept separate from the material discharged from other sections, as in my aforesaid patented apparatus. Within the "concave" is the "cylinder" C, fast on the shaft D, which latter extends through and beyond the "concave", its ends supported in suitable bearings $D^1$, and being provided with a pulley $D^2$ for driving it. The cylinder—as to the screw threads (hereinafter more particularly referred to) with which it is armed—has as a whole a taper from head to tail corresponding to that of the concave.

It is customary in this class of machines to make the "cylinder" and "concave" longitudinally adjustable, the one relatively to the other, in order to regulate the clearance between them. In my former patent I made the "cylinder" longitudinally adjustable for this purpose. In my present machine however it is the "concave" which is adjustable, the casing $A^1$, for this purpose, being provided with horizontal sleeves $A^2$ (Figs. 1, 2, 3) which fit and can slide on supporting guide rods $A^3$, secured in standards $A^4$ attached to the main frame A. One of the rods $A^3$ is rotatable in its bearings, and is provided with a hand wheel $A^5$ by which it may be rotated, and with an external screw threaded portion $A^6$ which engages the correspondingly screw threaded interior of that sleeve $A^7$ through which it passes.

By turning the hand wheel $A^5$, the casing $A^1$ will be moved lengthwise in one direction or the other, according to the direction of revolution of the hand wheel. The concave requires but slight capacity for movement for this purpose. Some three and one half inches is all that is in practice called for. While on this subject I may say that I find the best results on the whole are obtained where the adjustment is such that there is about $\frac{5}{8}$ of an inch space between the projections on the "cylinder" and those on the "concave." I do not desire however to be understood as restricting myself in this regard to any specified interval.

The feed opening H (Fig. 3) is in the top of the casing at the head of the concave and cylinder. To the opening is fitted the feed box $H^1$ (Fig. 1), which through a suitable spout (not shown) is in communication with a source of grain supply; and this spout should, of course, have a proper flexible connection with the feed box, so as to permit the same to move with the casing B when the latter is longitudinally adjusted. In the feed box is the feed plate or diaphragm $h$ provided with a feed opening $h^1$, and made up of two sheets of metal or other suitable material with an opening or passage $h^2$ (Fig. 9) between them, to receive and guide the sliding gate $h^3$, by which the feed to the machine is regulated. This gate has an opening $h^4$ corresponding to the opening $h^1$ in the diaphragm $h$, and is provided with two stops $h^5$, $h^6$. When $h^6$ is in contact with the feed box, the openings $h^4$ and $h^1$ register and the gate is open. When $h^5$ is in contact with the feed box (the position in which it is represented in Fig. 1) the openings $h^1$, $h^4$ are out of register and the gate is closed. To control the movement of the gate, I make use of a suitable regulator typified at R, having its regulating arm connected through suitable intermediaries, as indicated, to the gate—the regulator itself being driven from the shaft D of the "cylinder" through proper system of pulleys and belting. Such devices for the purpose of regulating feed are, however, not new; and I therefore do not deem it necessary to further describe the same here.

The "cylinder" is divided into a number of frusto-conical sections—three in this instance, $C^1$, $C^2$, $C^3$, respectively—which are set together end to end and mounted on, and secured to, the shaft D in the manner indicated in my aforesaid Patent No. 735,664, or in any other suitable way.

It will be noted that each section is armed with an external screw thread, $c^1$, $c^2$, $c^3$ respectively, of tapering cross section—widest at the base; and that while the body of the cylinder as a whole is cylindrical, the threads gradually diminish in depth from the head to the tail of the "cylinder" so as to give a taper formation to the same, corresponding to the taper of the "concave." It will also be noted that, while the sections are all of the same length, the threads on the several sections vary not only in height, but also in number of turns, this being due to differences in the thickness or cross section of the threads. It will also be noted that the threads although thus differing between one another, have all the same pitch in the sense that the distance between adjacent convolutions at their bases is the same throughout the length of the cylinder. This construction is designed to increase concentration and consequent pressure as the charge approaches the tail of the machine, as well as to compensate for the loss of material which may escape through the discharge perforations or holes in the concave; and it has that effect.

In a machine which I have built and operated, the thread $c^1$ on the first or head section $C^1$ starts one and one half inches thick at base, and one and one half inches high; it continues the same thickness, but gradually decreases in height to one inch at the end of the section. In the second section $C^2$ the thread begins one inch high and one inch thick at base, it continues one inch thick, but decreases in height to one half inch at the end of the section. In the third section $C^3$, the thread begins one inch thick at base and one half inch high, gradually decreasing in height to one quarter of an inch at about midway of the section, whence it merges into the surface, the remainder $c^4$ of this section having a smooth slightly tapering surface armed with projections such as will be presently described—the object of this portion $c^4$ being to disintegrate and loosen up the charge and to complete the work of the preceding portions of the "cylinder." I have used a "cylinder" thus proportioned with good results. The figures above given however are merely by way of illustration; and I desire it to be understood that I in no way limit myself thereto, inasmuch as the same can be considerably varied without varying the principle or mode of operation.

The "concave" is made up, as before said, of three sections, $B^1$, $B^2$, $B^3$, also. These sections of frusto-conical shape, are put together end to end and are suitably fastened to the ribs $a$ of the casing $A^1$ by screws or other suitable fastenings. The concave is formed with counter-sunk holes or perforations $b$ which, preferably, are all of the same size, the object being—as stated in my aforesaid patent—to carry off from any and all points on the cylinder properly sized fragments of grain, together with such other parts as are of a size to pass through along with them. The holes $b$, as seen more clearly in Fig. 14, are countersunk on both sides of the concave—on the inside to prevent grains from catching endwise and being slivered or chipped; on the outside to prevent plugging of the hole by the escaping fragments of grain. These holes or perforations are distributed throughout the area of the concave sections up to the points $x$ $x$, where the ribs $a$ merge into the body of the casing $A^1$—the perforations thus covering about three quarters of the circumference of the concave, and consequently affording free and instant escape for all fragments of the charge which have been properly reduced. Between the projections and at suitable or desired intervals apart are interspersed projections $p$ of pyramidal shape and rhomb horizontal section. These projections have rivet-like shanks $p^1$, as shown in Fig. 13, the shanks being applied to and fitted in any selected holes $b$ in the concave, and there headed up. These projections are set so as to have the same degree of pitch as the threads on the cylinder, as indicated in the enlarged elevation of a portion of the concave in Fig. 12.

While the projections on the concave have the same degree of pitch as that of the screw threads on the cylinder, yet they are pitched in an opposite direction to the latter. As, for example, the cylinder screw is a right hand screw, and to feed the material along must revolve in the direction of the arrow $m$ Figs. 1, 2. On the other hand to have like feed effect the projections on the concave (which does not revolve) must be pitched as a left hand screw. Seemingly the pitch of the projections in Fig. 12 does not accord with the foregoing statement, but this is only because the projections there represented are supposed to be on a portion of the far side of the concave. These projections thus formed and arranged are distributed throughout the whole area of the concave. Similar projections p are applied and secured to the periphery of the threads of the several cylinder sections, and to the smooth portion $c^4$ of the tail section $C^3$ and are also secured in the grooves between the threads—all as indicated in Fig. 2. Those upon the periphery of the threads have no pitch. Projections thus shaped glide through the grain, without catching the kernels and pushing them along, as was the case with previous forms. They merely turn the grains aside, raising and lowering them, and causing continuous change of position without violent disturbance of the mass, thus bringing the kernels into position where concentration and pressure may break them and where subsequent changes of position may bring about the friction requisite to separate the hulls and germs from the broken pieces of grain.

At the tail of the machine is the spout K into which is discharged the "tail stock" so-called—that is to say that portion of the charge which has not passed off through the perforations in the "concave". I have found that the "tail stock" comes out from the machine in such compressed and compact form that it will not of itself properly scatter or break up so as to pass readily down through the discharge spout. To obviate this difficulty I attach to the tail end of the "cylinder" wings k (Figs. 2 and 5) which meet the material and force it out into the discharge spout as fast as liberated from the machine.

The grain prior to entering the machine is preliminarily moistened to such an extent only as to toughen it so as to facilitate the hulling and at the same time decrease its brittleness, as set forth in Patent No. 707,058 granted to T. T. Gaff and myself August 12, 1902. And I can provide the apparatus with valve controlled pipes entering the "concave" at various points, as fully set forth and shown in my Letters Patent No. 735,664, to supply additional moisture to the material under treatment in order to replace that which may be dissipated during the progress of the material through the machine.

The operation is as follows: The grain, after having been previously treated and brought to proper condition for degermination, is allowed to flow continuously into the machine through the feed opening H. It thence passes along continuously through the machine, and the residue or "tail stock" consisting of such material as has not been screened off in the machine is carried off through the discharge spout K. In the first section of the machine where the pressure is lightest, only the weakest grains are broken.

In the second section the concentration and pressure will have so increased that the next weakest grains will be broken. In the third section pressure and concentration will have augmented to such an extent as to break the remainder of breakable grains and hull the remaining broken grains. Concentration and pressure increase in proportion to the decrease in size of the "cylinder" and "concave", the decrease in the width or thickness of the threads, and the decrease in the depth of the grooves between the threads. This construction, as will be seen by an inspection of Fig. 2, results in a gradual contraction of the free space between the body of the "cylinder" (which is cylindrical) and the "concave", in which the charge is contained and through which it moves continuously; and this gradual contraction of the free space between the cylinder and concave necessarily results in gradually increased pressure and concentration of the material. In each section, properly reduced fragments of grain pass off at once through the openings in the concave, as in the machine of my Patent No. 735,664.

The feed of the material to the machine is such that the "concave" or jacket B during the operation of the apparatus is constantly full of grain, which by the action of the spiral ribs or threads on the cylinder is continuously urged under compression towards the tail of the machine, the pressure increasing with the progress of the grain. It is because of this complete filling of the jacket that the screen holes or perforations b in the concave are extended up to the height indicated, covering about three quarters of the circumference of the concave. The revolution of the "cylinder" is not rapid as compared with machines hitherto in use; the breaking of the grains is due to the compression of the moving charge between the cylinder and the concave, rather than to any percussive action of the projections with which they are armed; and these low pyramidal projections act practically as means to stir gently the moving mass, so as to deflect or otherwise bring the individual grains into position where the breaking strain will be effective.

The work of hulling and degermination may be completed in the one machine. Or I may use a battery of two or more of such machines through which the material is successively carried, the second machine being adjusted for greater pressure and movement than the first, the third having greater pressure and movement than the second, and so on. I have ascertained that the grains in bulk will break lengthwise through the middle line of the grain under a pressure of from four to twentyfour pounds per square inch—say an average of twelve pounds per square inch. The same grain will not break crosswise—a thing to be avoided if possible—until a much higher pressure has been reached— say an average of one hundred pounds per square inch. There is therefore a large margin of safety between the two pressures which will permit variations of pressure for lengthwise breaking within limits that will thus break practically all of the breakable grains without attaining the point where crosswise fracture will be apt to take place.

In case of using a battery of three or more of the machines or sections of the machines as above suggested, I prefer to sift and winnow the material under treatment, after it passes one machine and before it enters the next, as described in the Gaff and Gent Patent No. 707,058 of August 12, 1902, hereinbefore referred to. And I also prefer to remoisten the unfinished portion between the successive treatments.

In all processes for degerming and hulling maize there is necessarily a loss in the way of "offal". The average offal under the best of the methods heretofore in use, so far as I am informed, is not far from 20 lbs. per bushel, while by my invention the offal at the most is only 12 lbs. per bushel—a saving of 8 lbs. per bushel or 14.29 per cent.

Having described my invention and the best way now known to me of carrying the same into practical effect I state in conclusion that I do not limit myself to the structural details hereinbefore set forth in illustration of my invention since manifestly the same can be widely varied without departure from the principle of the invention, the characteristic of which is the subjecting the previously prepared grain while moving in continuous flow to a breaking operation under a compression, and consequent concentration, which gradually increases with the progress of the grain, whereby the weakest grains are broken first, the next weakest next, and so on, and during the course of this operation separating out and carrying off from the unreduced portion of the grain still under treatment such fragments of grain as may from time to time be reduced to the proper size. This I believe to be broadly new with me. I however do not here claim this improvement in the process of degerming maize or Indian corn; I have made the same the subject of a separate application Serial No. 379,378, of even date herewith, on which Letters Patent will issue of even date herewith.

What I here claim and desire to secure by Letters Patent refers to the apparatus to effectuate that improvement in the process, and is as follows:

1. In apparatus for degerming maize, and in combination with a stationary "concave" decreasing in diameter as it approaches the tail of the machine, a rotary power-driven "cylinder" composed of a body of substantially the same diameter throughout, armed with external spiral threads of uniform pitch but decreasing in thickness and also in height as they approach the tail of the machine, substantially as and for the purposes hereinbefore set forth.

2. In apparatus for degerming maize, a stationary tapering "concave", and screen surfaces therein through which properly reduced fragments of grain, as they form, may pass off, in combination with a rotary power-driven "cylinder" composed of a body of substantially the same diameter throughout, armed with spiral threads of uniform pitch which decrease in thickness and in height as they approach the tail of the machine so as to impart to the "cylinder" as a whole a taper substantially conforming to that of the "concave", substantially as and for the purposes hereinbefore set forth.

3. The combination with the rotary power-driven cylinder composed of a body of substantially the same diameter throughout, armed with spiral threads of uniform pitch, but decreasing in thickness and in height as they approach the tail of the machine, of a stationary "concave" which correspondingly decreases in diameter towards the tail of the machine, openings or perforations therein for the escape of properly reduced fragments of grain, and low pyramidal projections arranged in spiral lines upon the interior of the "concave", substantially as and for the purposes hereinbefore set forth.

4. The combination with the rotary power-driven "cylinder" composed of a body of substantially the same diameter throughout, armed with spiral threads of uniform pitch but decreasing in thickness and height as they approach the tail of the machine, and low pyramidal projections located upon the periphery of the threads, and also on the bottom of the grooves between the threads, of a stationary tapering "concave" and projections of corresponding shape to those on the "cylinder" arranged in spiral lines upon the interior of the "concave", substantially as and for the purposes hereinbefore set forth.

In testimony whereof I affix my signature in presence of two witnesses.

JOSEPH FRANKLIN GENT.

Witnesses:
PEARL CLIFFORD,
MURIEL STUMP.